US010964051B2

(12) United States Patent
Kashu

(10) Patent No.: US 10,964,051 B2
(45) Date of Patent: Mar. 30, 2021

(54) IMAGE PROCESSING DEVICE, FOREIGN OBJECT INSPECTION DEVICE, AND IMAGE PROCESSING METHOD

(71) Applicant: Sumitomo Chemical Company, Limited, Tokyo (JP)

(72) Inventor: Koji Kashu, Niihama (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 126 days.

(21) Appl. No.: 16/369,313

(22) Filed: Mar. 29, 2019

(65) Prior Publication Data

US 2019/0304126 A1 Oct. 3, 2019

(30) Foreign Application Priority Data

Mar. 29, 2018 (JP) .............................. JP2018-065910

(51) Int. Cl.
| | |
|---|---|
| *G06T 7/73* | (2017.01) |
| *H04N 5/3745* | (2011.01) |
| *G06T 7/00* | (2017.01) |
| *H04N 5/232* | (2006.01) |
| *G06K 9/32* | (2006.01) |
| *H04N 5/341* | (2011.01) |

(52) U.S. Cl.
CPC .............. *G06T 7/73* (2017.01); *G06K 9/3241* (2013.01); *G06T 7/0002* (2013.01); *H04N 5/23229* (2013.01); *H04N 5/341* (2013.01); *H04N 5/37452* (2013.01)

(58) Field of Classification Search
CPC ....... G06T 7/73; G06T 7/0002; G06K 9/3241; H04N 5/23229; H04N 5/341; H04N 5/37452
See application file for complete search history.

(56) References Cited

U.S. PATENT DOCUMENTS 5,812,629 A * 9/1998 Clauser .................. A61B 6/466
378/62
9,675,273 B2 * 6/2017 Gluncic .................. A61B 6/12
(Continued)

FOREIGN PATENT DOCUMENTS

| JP | 2002230522 A | 8/2002 |
| JP | 2003156451 A | 5/2003 |
| JP | 2005-265467 A | 9/2005 |

*Primary Examiner* — Mia M Thomas
(74) *Attorney, Agent, or Firm* — Panitch Schwarze Belisario & Nadel LLP

(57) ABSTRACT

An image processing device and method for reducing the risk of a failure to detect a foreign object provided. The image processing device is configured for processing an image based on an X ray having propagated through an inspection target having a foreign object. The image processing device includes a storage section configured to store respective first pixel values of a plurality of pixels that form the image; a pixel value computing section configured to calculate respective second pixel values of the plurality of pixels on a basis of the first pixel values; and a pixel value integrating section configured to integrate respective second pixel values of a group of pixels belonging in a continuous region. The method includes steps of storing the respective first pixel values, calculating the respective second pixel values, and integrating respective second pixel values of a group of pixels belonging in a continuous region.

9 Claims, 9 Drawing Sheets

(56) References Cited

U.S. PATENT DOCUMENTS

| | | | | |
|---|---|---|---|---|
| 9,947,090 B2* | 4/2018 | Agam | ................... | G06K 9/6256 |
| 2007/0098141 A1* | 5/2007 | Hjarn | ..................... | A61B 6/502 |
| | | | | 378/37 |
| 2016/0379794 A1* | 12/2016 | Shiozawa | ............... | H01J 35/08 |
| | | | | 378/101 |
| 2017/0027531 A1* | 2/2017 | Shiozawa | ............... | A61B 6/025 |
| 2018/0038805 A1* | 2/2018 | Heikkila | .................. | G06T 7/001 |
| 2018/0182085 A1* | 6/2018 | Zhao | ..................... | G01V 5/0016 |
| 2019/0297238 A1* | 9/2019 | Klosterman | ........ | H04N 5/23218 |
| 2019/0304125 A1* | 10/2019 | Kashu | ................... | G06K 9/3241 |
| 2019/0304127 A1* | 10/2019 | Kashu | ................... | G06K 9/4652 |

* cited by examiner

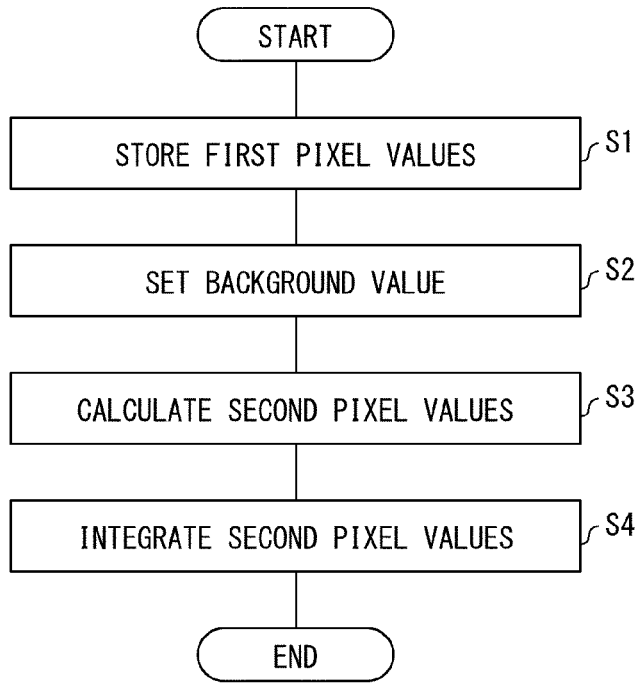
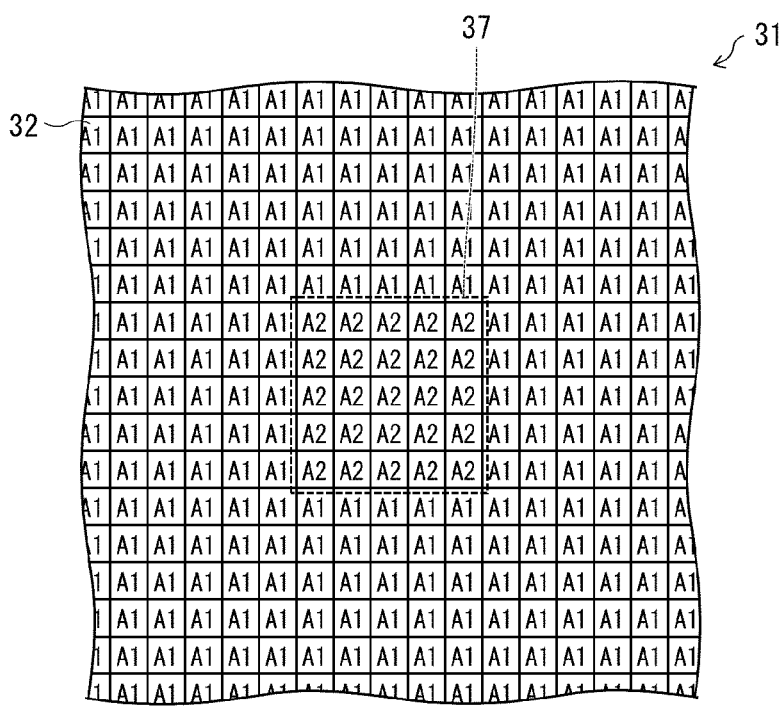

FIG. 12

| | WORST S | WORST N | WORST S/ WORST N RATIO | FOREIGN-OBJECT IMAGE 1 | FOREIGN-OBJECT IMAGE 2 | FOREIGN-OBJECT IMAGE 3 | FOREIGN-OBJECT IMAGE 4 | NO-FOREIGN-OBJECT IMAGE 1 | NO-FOREIGN-OBJECT IMAGE 2 | NO-FOREIGN-OBJECT IMAGE 3 | NO-FOREIGN-OBJECT IMAGE 4 | NO-FOREIGN-OBJECT IMAGE 5 | NO-FOREIGN-OBJECT IMAGE 6 | NO-FOREIGN-OBJECT IMAGE 7 | NO-FOREIGN-OBJECT IMAGE 8 | NO-FOREIGN-OBJECT IMAGE 9 | NO-FOREIGN-OBJECT IMAGE 10 | NO-FOREIGN-OBJECT IMAGE 11 | NO-FOREIGN-OBJECT IMAGE 12 | NO-FOREIGN-OBJECT IMAGE 13 |
|---|---|---|---|---|---|---|---|---|---|---|---|---|---|---|---|---|---|---|---|---|
| APPROACH 1 | -1.62% | -1.77% | 0.92 | -2.13% | -1.86% | -1.62% | -2.09% | -1.69% | -1.64% | -1.69% | -1.61% | -1.67% | -1.72% | -1.64% | -1.77% | -1.66% | -1.61% | -1.69% | -1.67% | -1.67% |
| APPROACH 2 | -2.06% | -2.19% | 0.94 | -2.43% | -2.27% | -2.06% | -2.50% | -1.78% | -1.70% | -1.90% | -1.79% | -2.19% | -1.83% | -1.65% | -1.99% | -1.86% | -1.67% | -1.81% | -1.91% | -1.80% |
| APPROACH 3 | -1.52% | -1.31% | 1.16 | -1.63% | -1.71% | -1.52% | -1.91% | -0.99% | -1.18% | -0.92% | -1.16% | -1.05% | -1.06% | -0.89% | -1.31% | -1.26% | -0.95% | -1.17% | -1.07% | -1.08% |
| APPROACH 4 | -1.17% | -0.97% | 1.21 | -1.25% | -1.17% | -1.31% | -1.32% | -0.67% | -0.90% | -0.61% | -0.86% | -0.76% | -0.79% | -0.65% | -0.97% | -0.89% | -0.71% | -0.74% | -0.65% | -0.80% |
| APPROACH 5 | -0.90% | -0.73% | 1.24 | -0.98% | -0.90% | -0.98% | -1.06% | -0.61% | -0.73% | -0.51% | -0.57% | -0.59% | -0.59% | -0.43% | -0.72% | -0.65% | -0.57% | -0.50% | -0.54% | -0.60% |
| APPROACH 6 | -1.36% | -1.12% | 1.21 | -1.39% | -1.45% | -1.36% | -1.65% | -0.83% | -1.00% | -0.78% | -0.92% | -0.98% | -0.92% | -0.71% | -1.12% | -1.05% | -0.84% | -0.95% | -0.85% | -0.92% |
| APPROACH 7 | -1.15% | -0.92% | 1.25 | -1.17% | -1.15% | -1.15% | -1.30% | -0.64% | -0.87% | -0.58% | -0.72% | -0.74% | -0.73% | -0.53% | -0.92% | -0.83% | -0.67% | -0.71% | -0.61% | -0.76% |

IMAGE PROCESSING DEVICE, FOREIGN OBJECT INSPECTION DEVICE, AND IMAGE PROCESSING METHOD

This Nonprovisional application claims priority under 35 U.S.C. § 119 on Patent Application No. 2018-065910 filed in Japan on Mar. 29, 2018, the entire contents of which are hereby incorporated by reference.

TECHNICAL FIELD

The present invention relates to an image processing device, a foreign object inspection device, and an image processing method.

BACKGROUND ART

Nonaqueous electrolyte secondary batteries such as lithium-ion secondary batteries are in wide use as batteries for personal computers, mobile telephones, portable information terminals, and the like. Lithium-ion secondary batteries, in particular, are drawing attention as batteries that help reduce $CO_2$ emissions and that contribute to energy saving, as compared to conventional secondary batteries.

Separator rolls have been under development, the separator rolls each including a core and a nonaqueous electrolyte secondary battery separator wound around the core. In addition, foreign object inspection has been researched for detecting foreign objects adhering to a separator roll.

An example technique applicable to the foreign object inspection is disclosed in Patent Literature 1.

The technique disclosed in Patent Literature 1 includes (i) causing an illumination device such as a fluorescent lamp to emit light toward an inspection target such as a film so that the light is reflected by the inspection target or so that the light propagates through the inspection target and (ii) causing a CCD camera to capture an image based on the light having been reflected by the inspection target or having propagated through the inspection target to obtain data on an image of the inspection target. The technique further includes (i) integrating the respective density levels of individual pixels on the basis of the data on the image of the inspection target and (ii) comparing the integrated value with a predetermined threshold value to detect any defect.

CITATION LIST

Patent Literature

[Patent Literature 1]
Japanese Patent Application Publication, Tokukai, No. 2005-265467 (Publication Date: Sep. 29, 2005)

SUMMARY OF INVENTION

Technical Problem

Inspecting, for a foreign object, a separator wound in layers around a core requires using, as a light source, not visible light but an X ray, which propagates through even an object having a somewhat large thickness.

Typically, however, an X-ray source is not a perfect point light source, but emits an X ray from a surface having an area. X rays are unlike visible light: It is difficult to reduce the spot diameter of an X ray with use of a lens or the like. Further, radiography may require an exposure time period longer than that for image capturing involving use of visible light. During such a long time period, shaking of an environment in which the equipment is installed and/or unreliable accuracy with which an inspection target is held by a mechanism may problematically cause the positional relationship between the X-ray source, the light receiving section, and the inspection target to change slightly.

Thus, when an X-ray image sensor captures an image on the basis of an X ray emitted by an X-ray source and attenuated by a foreign object, the amount of X-ray attenuation to be reflected by a pixel is unintentionally reflected partially by a pixel(s) present in the vicinity of the above pixel. This results in a blur in that portion of the image captured by the X-ray image sensor which corresponds to a foreign object. Such a blur in the portion corresponding to a foreign object leads to a failure to detect the foreign object.

An aspect of the present invention has an object of reducing the risk of a failure to detect a foreign object.

Solution to Problem

In order to attain the above object, an image processing device in accordance with an embodiment of the present invention is an image processing device for processing an image based on an X ray having been emitted radially by an X-ray source and having propagated through an inspection target having a foreign object, the image processing device including: a storage section configured to store respective first pixel values of a plurality of pixels that form the image; a pixel value computing section configured to calculate respective second pixel values of the plurality of pixels on a basis of the first pixel values; and a pixel value integrating section configured to integrate respective second pixel values of a group of pixels belonging in a continuous region.

An image processing method in accordance with an embodiment of the present invention is an image processing method for processing an image based on an X ray having been emitted radially by an X-ray source and having propagated through an inspection target including a foreign object, the image processing method including: a storage step of storing respective first pixel values of a plurality of pixels that form the image; a pixel value computing step of calculating respective second pixel values of the plurality of pixels on a basis of the first pixel values; and a pixel value integrating step of integrating respective second pixel values of a group of pixels belonging in a continuous region. This reduces the risk of a failure to detect a foreign object.

Advantageous Effects of Invention

An aspect of the present invention advantageously reduces the risk of a failure to detect a foreign object.

BRIEF DESCRIPTION OF DRAWINGS

FIG. 4 is a flowchart illustrating a flow of how the image processing device processes an image.

FIG. 5 shows the respective first pixel values that the storage section stores of the plurality of pixels in FIG. 2.

FIG. 12 is a table that shows the results of verifying the effectiveness of the pixel value integrating section of a foreign object inspection device that uses an X ray as an electromagnetic wave.

DESCRIPTION OF EMBODIMENTS

Figure 1:
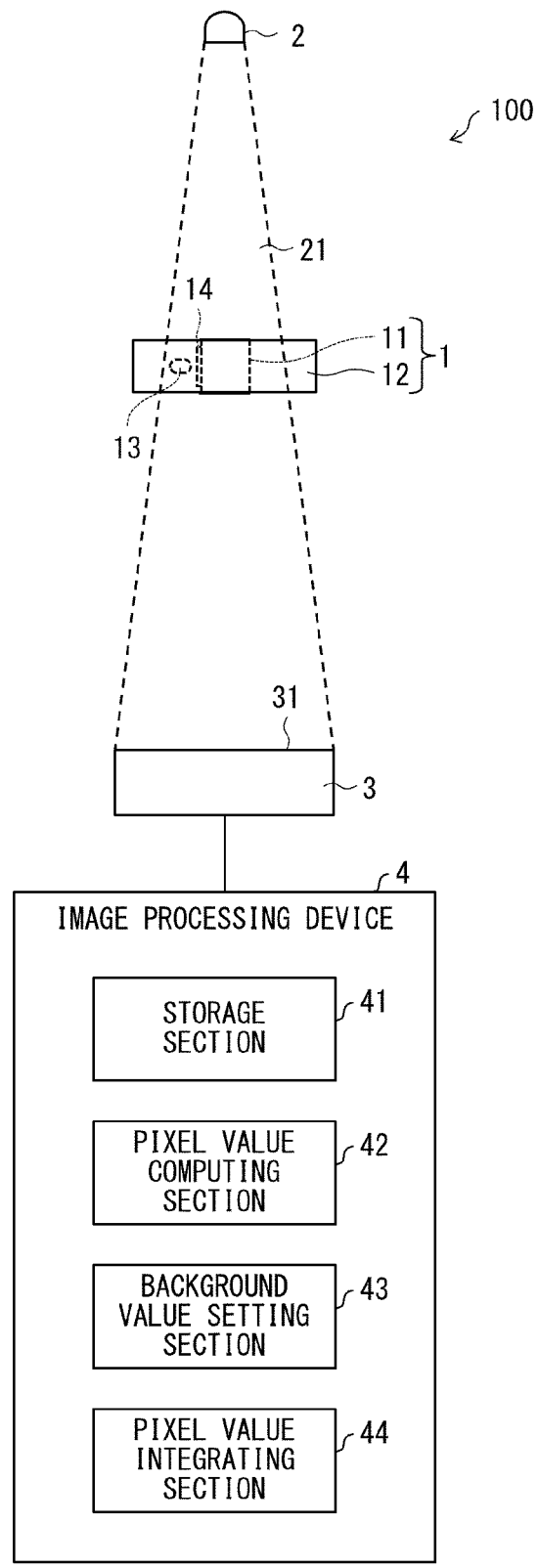
FIG. 1 is a diagram schematically illustrating the configuration of a foreign object inspection device in accordance with an aspect of the present invention.
Figure 2:
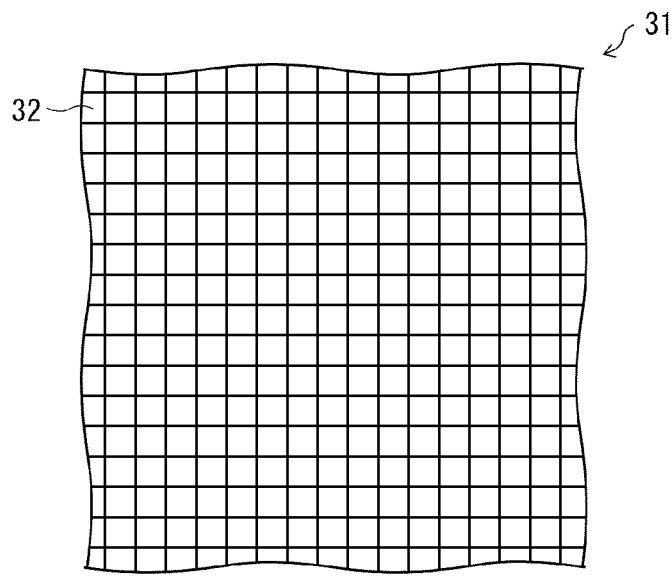
FIG. 2 is a plan view of a principal surface of an image sensor.

FIG. 1 is a diagram schematically illustrating the configuration of a foreign object inspection device 100 in accordance with an aspect of the present invention. FIG. 2 is a plan view of a principal surface 31 of an image sensor 3.

The foreign object inspection device 100 is configured to detect a foreign object 13 adhering to an inspection target 1. The inspection target 1 is a separator roll including a core 11 and a nonaqueous electrolyte secondary battery separator 12 wound around the core 11. The inspection target 1 may alternatively be a roll including a core 11 and a film wound around the core 11 which film is other than a nonaqueous electrolyte secondary battery separator 12, or be something other than a roll including a core 11 and a film wound around the core 11. The foreign object inspection device 100 includes an electromagnetic wave generating source 2, an image sensor 3, and an image processing device 4.

The electromagnetic wave generating source 2 emits an electromagnetic wave 21 to a side surface of the inspection target 1. The electromagnetic wave 21 propagates through the inspection target 1 and the foreign object 13, and exits the inspection target 1 from the other side surface. The two side surfaces of the inspection target 1 are the respective surfaces at the opposite widthwise ends of the nonaqueous electrolyte secondary battery separator 12. The width direction of the nonaqueous electrolyte secondary battery separator refers to that direction along the surface of the nonaqueous electrolyte secondary battery separator 12 which is perpendicular to the direction in which an unfinished nonaqueous electrolyte secondary battery separator 12 is conveyed during the process of producing the nonaqueous electrolyte secondary battery separator 12. The electromagnetic wave 21 for the present embodiment is an X ray that the electromagnetic wave generating source 2 emits radially.

The image sensor 3 has a principal surface 31. The image sensor 3 includes, on the principal surface 31, a plurality of pixels 32 configured to (i) receive an electromagnetic wave 21 having propagated through the inspection target 1 and the foreign object 13 and thereby (ii) form an image on the basis of the electromagnetic wave 21. For convenience of illustration, FIG. 2 shows, among the plurality of pixels 32, only 225 pixels 32 arranged in a 15×15 matrix. The image sensor 3 for the present embodiment is an X-ray image sensor.

An image formed by the plurality of pixels 32 can be described as being an image captured of (i) an inspection target 1 as the background in an inspection image and (ii) a foreign object 13 having contrast to the background.

The present embodiment assumes that the foreign object 13 is a substance (for example, a metal foreign object) that attenuates a propagating X ray more than the inspection target 1 does. In this case, an image formed by the plurality of pixels 32 can be described as being an image formed on the basis of an electromagnetic wave 21 that has propagated through an inspection target 1 with a foreign object 13 adhering thereto and that has been attenuated more by the foreign object 13 than by the inspection target 1.

The foreign object 13 may alternatively be something (for example, a defective hollow [air bubble] in an inspection target 1) that attenuates a propagating X ray less than the inspection target 1 does. In this case, an image formed by the plurality of pixels 32 can be described as being an image formed on the basis of an electromagnetic wave 21 that has propagated through an inspection target 1 with a foreign object 13 adhering thereto and that has been attenuated less by the foreign object 13 than by the inspection target 1.

In either case, an image formed by the plurality of pixels 32 is an image captured of (i) an inspection target 1 as the background in an inspection image and (ii) a foreign object 13 having contrast to the background.

The image processing device 4 is configured to process an image formed by the plurality of pixels 32. The image processing device 4 includes a storage section 41, a pixel value computing section 42, a background value setting section 43, and a pixel value integrating section 44.

The storage section 41 includes, for example, a well-known storage medium. The storage section 41 stores the respective pixel values of the plurality of pixels 32, which form an image that the image processing device 4 processes. The description below uses the term "first pixel values" to refer to those pixel values which the storage section 41 stores. The specification of the present application assumes that the first pixel values and a later-described background value are larger in a case where the corresponding image is brighter. The first pixel values and the background value may alternatively be smaller in the case where the corresponding image is brighter.

Figure 3:
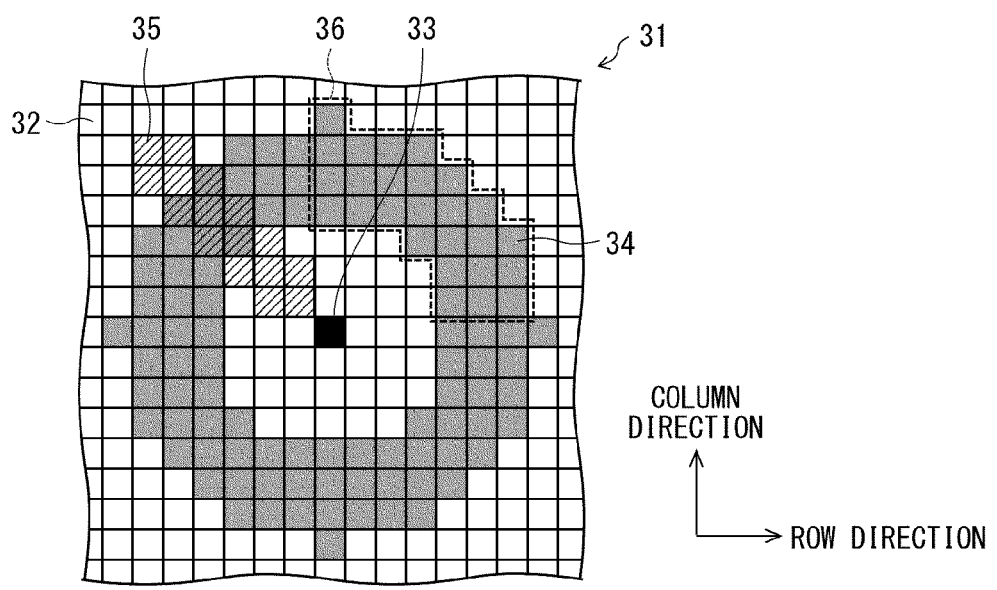
FIG. 3 is a plan view of the principal surface, illustrating an example of how a plurality of reference pixels are set.

FIG. 3 is a plan view of the principal surface 31, illustrating an example of how a plurality of reference pixels 34 are set. FIG. 3 shows shaded pixels 32 to indicate the plurality of reference pixels 34. The reference pixels 34 are, as described later, pixels 32 necessary to set a background value for the corresponding target pixel 33.

The pixel value computing section 42 includes, for example, a central processing unit (CPU) or a hardware logic. The description below deals with the target pixel 33 in FIG. 3 as an example. The target pixel 33 is, as described later, a pixel 32 for which a background value is set with reference to a plurality of corresponding reference pixels 34. The pixel value computing section 42 selects each of the plurality of pixels 32 as a target pixel 33 and calculates a second pixel value of the target pixel 33 on the basis of the first pixel values stored in the storage section 41. The pixel value computing section 42, stated differently, calculates the second pixel value of each pixel 32.

The second pixel value of a target pixel 33 or each pixel 32 is the value of the ratio of the difference between the corresponding first pixel value and the background value to the background value. The background value can be described as being a value equivalent to how much the electromagnetic wave 21 is attenuated by the inspection target 1. The second pixel value of a target pixel 33 or each pixel 32 is, in other words, expressed as "(corresponding first pixel value-background value)/background value". The result of computing a second pixel value is referred to also as "relative density", as the computation involves determining the ratio of the above difference to the background value.

The background value setting section 43 includes, for example, a CPU or a hardware logic. The background value setting section 43 obtains, for each target pixel 33, a value for use as a background value on the basis of the respective first pixel values of reference pixels 34 present in the vicinity of the target pixel 33 and each having a predetermined positional relationship with the target pixel 33. The background value setting section 43 then sets the background value for the target pixel 33 to the value obtained. The expression "each target pixel 33" is equivalent to the expression "each pixel 32".

The pixel value integrating section 44 is configured to integrate the respective second pixel values of a group of pixels belonging in a particular continuous region.

FIG. 4 is a flowchart illustrating a flow of how the image processing device 4 processes an image.

First, when the plurality of pixels 32 have formed an image on the basis of an electromagnetic wave 21, the storage section 41 registers the respective first pixel values of the plurality of pixels 32. This corresponds to step S1 in FIG. 4. FIG. 5 shows the respective first pixel values that the storage section 41 stores of the plurality of pixels 32 in FIG. 2. FIG. 5 illustrates an example in which among the 225 pixels 32 mentioned above, (i) 25 (5×5) central pixels 32 form an image on the basis of that portion of an electromagnetic wave 21 which has been attenuated by an inspection target 1 and a foreign object 13, and (ii) the other pixels 32 form an image on the basis of that portion of the electromagnetic wave 21 which has been attenuated by the inspection target 1 only. The 25 central pixels 32 correspond to the pixel group 37. FIG. 5 shows "A1" and "A2", which are defined as follows:

A1: First pixel value corresponding to the amount of attenuation of an electromagnetic wave 21 by an inspection target 1

A2: First pixel value corresponding to the amount of attenuation of an electromagnetic wave 21 by an inspection target 1 and a foreign object 13

Subsequently to step S1, the background value setting section 43 sets a background value for each pixel 32. This corresponds to step S2 in FIG. 4. The background value setting section 43 setting a background value allows the foreign object inspection device 100 to produce the following effect:

With the above configuration, the background value setting section 43 sets a background value on the basis of the respective first pixel values of reference pixels 34 present in the vicinity of the target pixel 33. In a case where, for instance, radiographic inspection involves detecting (i) an inspection target 1 having a somewhat varying, but relatively high transmittance and (ii) a foreign object 13 attached to the inspection target 1 and having a relatively low transmittance, the above configuration allows a second pixel value to be calculated which second pixel value is influenced less by the transmittance variation. Referring to the second pixel value in detecting a foreign object 13 allows high-accuracy foreign object inspection.

The above configuration, in other words, allows the distribution of transmittance of an inspection target 1 to be canceled out. For instance, even in a case where an inspection target 1 has a transmittance that varies (or is distributed) according to the position on the inspection target 1, and the variation cannot be represented with straight contour lines, the contour lines each having a low curvature allows a background value to be set mostly accurately (that is, with only a slight error). This in turn allows the correct second pixel value to be calculated.

For the present embodiment, the electromagnetic wave generating source 2 causes electrons to strike a metal plate to generate an X ray. Since an electron-struck portion of the metal plate becomes heated, the metal plate is configured to be shaken so that electrons strike different portions of the metal plate. This configuration causes the electromagnetic wave generating source 2 to generate not an X ray in the shape of a dot, but a planar X ray. Consequently, in a case where the electromagnetic wave generating source 2 emits such an X ray as an electromagnetic wave 21, each image captured on the basis of the electromagnetic wave 21 may have a variation in its brightness distribution. Further, each image captured on the basis of the electromagnetic wave 21 may have a variation in its brightness distribution due to noise caused to the image. Even in such cases, the above configuration allows a second pixel value to be calculated which second pixel value is influenced less by the above variations.

The foreign object inspection device 100 selects reference pixels 34 while excluding any pixel 32 having an extremely large or extremely small first pixel value to prevent the background value from being excessively larger or excessively smaller than a desired value. This allows a second pixel value to be calculated which second pixel value is influenced less by the above variations.

The foreign object inspection device 100 selects at least one reference pixel 34, but preferably selects a plurality of reference pixels 34 as illustrated in FIG. 3. This preferable configuration allows a larger number of first pixel values to be referred to in finding a value for use as a background value, and thereby allows a background value to be set by any of a wider range of methods. The description below deals with such options.

The plurality of reference pixels 34 are preferably multiple pixels 32 surrounding the corresponding target pixel 33 as illustrated in FIG. 3.

In a case where a reference pixel(s) 34 and another pixel(s) present in the vicinity of the reference pixel(s) 34 are each an unsuitable pixel 35 having a first pixel value that is not suited as a value for use in setting a background value, the above configuration can reduce the proportion of unsuitable pixels 35 among the plurality of reference pixels 34. This makes it possible to reduce the risk of the first pixel value of an unsuitable pixel 35 adversely affecting how a background value is set.

Assuming that the hatched pixels 32 in FIG. 3 are unsuitable pixels 35, those unsuitable pixels 35 are present locally at an upper left portion of the drawing. With the above configuration, some reference pixels 34 are unsuitable pixels 35, while many other reference pixels 34 are not unsuitable pixels 35. The above configuration can, as in this case, reduce the proportion of unsuitable pixels 35 among the plurality of reference pixels 34.

Example unsuitable pixels 35 include pixels 32 that form an image on the basis of an electromagnetic wave 21 having propagated through a tape or label 14 attached to an inspection target 1. Such pixels 32 tend to have first pixel values that are extremely smaller than those of pixels 32 that form a shadow-free image on the basis of an electromagnetic wave 21 having propagated through an inspection target 1 only.

The plurality of reference pixels 34 are preferably multiple pixels 32 present symmetrically in the row direction and the column direction relative to the corresponding target pixel 33 as illustrated in FIG. 3. The row direction and the column direction correspond respectively to "ROW DIRECTION" and "COLUMN DIRECTION" in FIG. 3.

The plurality of reference pixels 34 shown in FIG. 3 can be described as being constituted of four pixel groups 36 arranged in fourfold symmetry relative to the target pixel 33 as the center. As in this case, the plurality of reference pixels 34 are preferably constituted of multiple pixels 32 present in n-fold symmetry (where n is an integer of 2 or greater) relative to the corresponding target pixel 33 as the center.

Regardless of the direction in which unsuitable pixels 35 are present locally relative to the target pixel 33, the above configuration can reduce the proportion of unsuitable pixels 35 among the plurality of reference pixels 34. This makes it possible to reduce the risk of the first pixel value of an unsuitable pixel 35 adversely affecting how a background value is set.

FIG. 3 illustrates a case where a plurality of unsuitable pixels 35 are present locally in an upper left direction from the target pixel 33. With the above configuration, some reference pixels 34 are unsuitable pixels 35, while many other reference pixels 34 are not unsuitable pixels 35. The above configuration can, as in this case, reduce the proportion of unsuitable pixels 35 among the plurality of reference pixels 34.

In a case where, for instance, there is a need to change the direction in which the foreign object inspection device 100 captures an image of an inspection target 1, the portion at which a plurality of unsuitable pixels 35 are present locally will be changed accordingly. In a case where the orientation of an inspection target 1 unfortunately needs to be changed as a result of it being difficult for the foreign object inspection device 100 to sufficiently control the orientation of the inspection target 1, the portion at which a plurality of unsuitable pixels 35 are present locally will be changed as well. The foreign object inspection device 100 is capable of reducing the proportion of unsuitable pixels 35 among the plurality of reference pixels 34 both before and after a change of the direction in which the foreign object inspection device 100 captures an image of an inspection target 1. The foreign object inspection device 100 can thus be described as having a small dependence on the direction in which the foreign object inspection device 100 captures an image of an inspection target 1.

FIG. 3 illustrates the plurality of reference pixels as multiple pixels 32 that are arranged to be adjacent to one another in a cohesive group surrounding the target pixel 33. The arrangement of reference pixels is, however, not limited to this. At least one reference pixel 34 may be present apart from the other reference pixels 34. The reference pixels 34 may, for instance, be scattered around. The reference pixels 34 may alternatively be arranged to form a plurality of blocks that are scattered around, the blocks each including reference pixels 34 adjacent to one another.

The background value setting section 43 sets the background value to (i) the median value among the respective first pixel values of the plurality of reference pixels 34 or (ii) a value ranked in a predetermined place among the respective first pixel values of the plurality of reference pixels 34 except for the maximum value and the minimum value. The median value refers to (i) supposing that the total number of the respective first pixel values of the plurality of reference pixels 34 is 2p (where p is a natural number), the average of the p-th largest first pixel value and the (p+1)-th largest first pixel value, and (ii) supposing that the total number is 2p+1, the (p+1)-th largest first pixel value. The predetermined place among the respective first pixel values of the plurality of reference pixels 34 except for the maximum value and the minimum value preferably refers to a rank that allows an appropriate background value to be calculated easily according to properties such as noise. A preferable value for the rank is usually a value as much close as possible to half the total number. The rank may, however, preferably be selected on the basis of, for example, the mode depending on the shape and/or placement of the inspection target 1. This is a method including (i) drawing a histogram of the respective brightnesses of the plurality of reference pixels 34 and (ii) selecting the predetermined place on the basis of how frequently each brightness appears (for example, selecting a rank corresponding to the brightness that appears with the highest frequency).

The above configuration makes it easy to prevent the background value setting section 43 from setting the background value to an extremely large or extremely small value among the respective first pixel values of the plurality of reference pixels 34. The above configuration, in other words, makes it possible to prevent the background value from indicating a background with an inappropriately extreme brightness or inappropriately extreme darkness. The above configuration also makes it easy to prevent the background value from being much larger or much smaller than an appropriate background value due to the above inappropriateness. The above configuration thereby makes it possible to set a background value more suitable for an image captured.

In a case where, for instance, a reference pixel 34 forms an image including noise, that reference pixel 34 can have an extremely large or extremely small first pixel value. The foreign object inspection device 100 can be described as being capable of reducing the risk of the background value being set to a first pixel value changed unintentionally due to the noise.

The background value setting section 43 may be used to, for a foreign object inspection involving causing an electromagnetic wave 21 to be reflected by an inspection target 1 and a foreign object 13, set the background value to a value equivalent to the amount of attenuation of the electromagnetic wave 21 by the inspection target 1.

Figure 6:
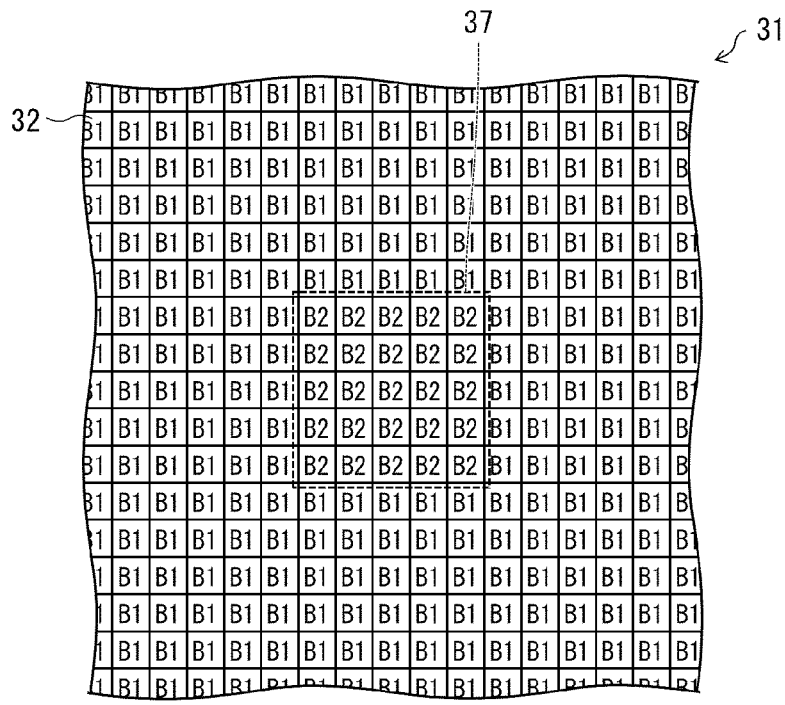
FIG. 6 shows the respective second pixel values that the pixel value computing section has calculated of the plurality of pixels in FIG. 2 on the basis of the first pixel values in FIG. 5 and a background value set for each pixel.

Subsequently to step S2, the pixel value computing section 42 calculates the second pixel value of each pixel 32. This corresponds to step S3 in FIG. 4. FIG. 6 shows the respective second pixel values that the pixel value computing section 42 has calculated of the plurality of pixels 32 in FIG. 2 on the basis of the first pixel values in FIG. 5 and a background value set for each pixel 32. FIG. 6 shows "B1" and "B2", which are defined as follows:

$$B1 = (A1 - (\text{background value of corresponding pixel } 32) / (\text{background value of corresponding pixel } 32))) \quad \text{B1:}$$

$$B2 = (A2 - (\text{background value of corresponding pixel } 32) / (\text{background value of corresponding pixel } 32))) \quad \text{B2:}$$

Ideally, A1 is equal to the background value of the corresponding pixel 32, so that B1 is 0. Each second pixel value reflects the thickness of that portion of a foreign object 13 which corresponds to the pixel 32.

Subsequently to step S3, the pixel value integrating section 44 integrates the respective second pixel values of a group of pixels belonging in a particular continuous region. This corresponds to step S4 in FIG. 4.

Figure 7:
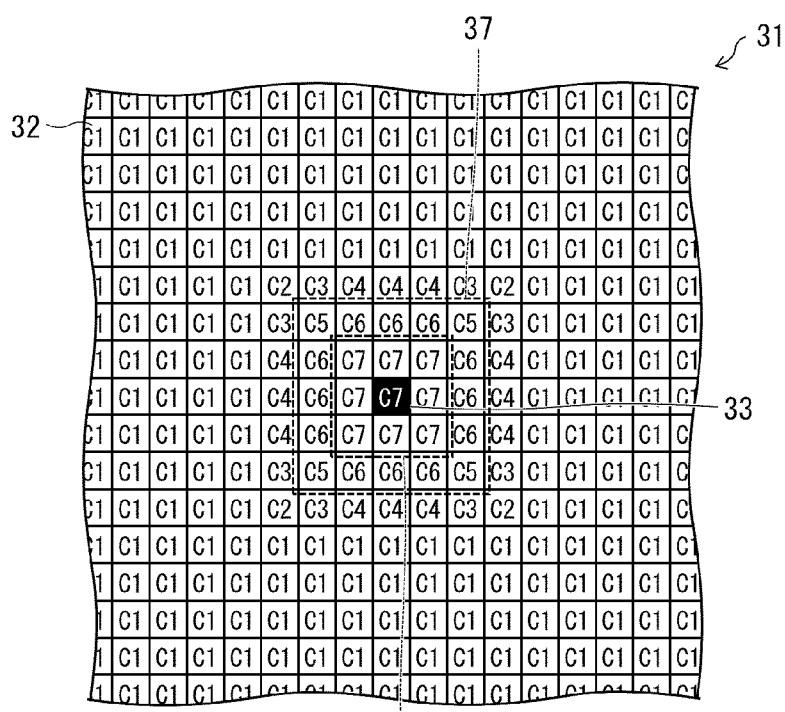
FIG. 7 shows the respective integrated values that the pixel value integrating section has produced of the plurality of pixels in FIG. 2 on the basis of the second pixel values in FIG. 6.

FIG. 7 shows the respective integrated values that the pixel value integrating section 44 has produced of the plurality of pixels 32 in FIG. 2 on the basis of the second pixel values in FIG. 6. FIG. 7 illustrates an example in which the pixel value integrating section 44 selects each of a plurality of pixels 32 as a target pixel 33, selects as a continuous region a total of nine pixels 32 arranged in a 3×3 matrix with the target pixel 33 as the center, and integrates the respective second pixel values of the nine pixels 32, which forms a pixel group 38 belonging in the continuous region. FIG. 7 shows "C1" to "C7", which are defined as follows:

$$C1=9*B1 \quad \text{C1:}$$

$$C2=8*B1+1*B2 \quad \text{C2:}$$

$$C3=7*B1+2*B2 \quad \text{C3:}$$

$$C4=6*B1+3*B2 \quad \text{C4:}$$

$$C5=5*B1+4*B2 \quad \text{C5:}$$

$$C6=3*B1+6*B2 \quad \text{C6:}$$

$$C7=9*B2 \quad \text{C7:}$$

As described above, the electromagnetic wave generating source 2 generates not an X ray in the shape of a dot, but a planar X ray. Consequently, in a case where the electromagnetic wave generating source 2 emits such an X ray as an electromagnetic wave 21, an image based on the electromagnetic wave 21 is blurred. Thus, the amount of attenuation to be reflected by a pixel 32 for that portion of an image which corresponds to a foreign object 13 is (i) unintentionally reflected partially by a pixel(s) 32 present in the vicinity of the above pixel 32 and is (ii) decreased accordingly.

X rays are unlike visible light: It is difficult to reduce the spot diameter of an X ray or convert an X ray into parallel light with use of a lens. Thus, that portion of an X-ray image which corresponds to a foreign object 13 is easily blurred as compared to a case where visible light is used.

With the above configuration, the pixel value integrating section 44 integrates the respective second pixel values of pixels in a group belonging in a particular continuous region. Setting the size of the continuous region to a size larger than the size of a foreign object 13 as a detection target makes it possible to calculate the sum total of the amount of X-ray attenuation caused by the foreign object 13. This allows that portion of an image which corresponds to a foreign object 13 to be detected, thereby reducing the risk of a failure to detect a foreign object 13. Further, the above configuration makes it possible to reduce the risk of a failure to detect a foreign object 13 even in a case where the image is blurred. This advantage makes it possible to shorten the exposure time period for image capturing as compared to conventional art. These effects can be produced even with a configuration in which the pixel value integrating section 44 integrates, instead of second pixel values, the first pixel values stored in the storage section 41.

To sum up the above description, the above particular continuous region is a region larger than a region that includes at least all pixels 32 that form an image based on an electromagnetic wave 21 attenuated by an inspection target 1 and a foreign object 13.

The above particular continuous region is preferably a region larger than a region that further includes all pixels 32 corresponding to a blur of that portion of an image which corresponds to a foreign object 13. This more reliably allows that portion of an image which corresponds to a foreign object 13 to be detected.

The above particular continuous region may be adjusted as appropriate so as to include at least a pixel(s) corresponding to a blur of that portion of an image which corresponds to a foreign object 13.

The integrated value of the respective second pixel values of multiple pixels 32 belonging in a particular continuous region corresponds to the volume of that portion of a foreign object 13 which corresponds to those multiple pixels 32. This makes it possible to estimate the volume of a portion of a foreign object 13 or the entire foreign object 13, thereby making it possible to determine the presence or absence of a foreign object 13 having a particular volume or larger. The above configuration, in other words, makes it possible to estimate the three-dimensional size of a foreign object 13.

The description below deals in detail with how the amount of attenuation of an X ray as an electromagnetic wave 21 is related to the volume of a foreign object 13. The volume of a foreign object 13 is equivalent to the three-dimensional size of the foreign object 13. The description below assumes that a foreign object 13 has a minutely small size. Specifically, such a minutely small foreign object 13 is sized such that the foreign object 13 would be contained in a sphere having a diameter of, for example, not less than 0.05 mm and not more than 0.3 mm.

The transmittance T of an electromagnetic wave 21 can be determined by Mathematical Expression (1) below. In Mathematical Expression (1), "a" represents the absorption coefficient of a substance through which the electromagnetic wave 21 propagates, and "z" represents the total length over which the electromagnetic wave 21 propagates through the substance. In a case where an electromagnetic wave 21 enters the substance once, "z" represents the thickness of the substance in the direction in which the electromagnetic wave 21 propagates. An electromagnetic wave 21 may enter the substance two or more times in a case where, for example, the substance is hollowed or curved.

$$T=e^{-ax} \quad \text{[Math. 1]}$$

The degree by which an image based on an electromagnetic wave 21 is darkened due to the electromagnetic wave 21 propagating through a foreign object 13 can be represented by 1−T. This 1−T is referred to as blocking rate.

Figure 8:
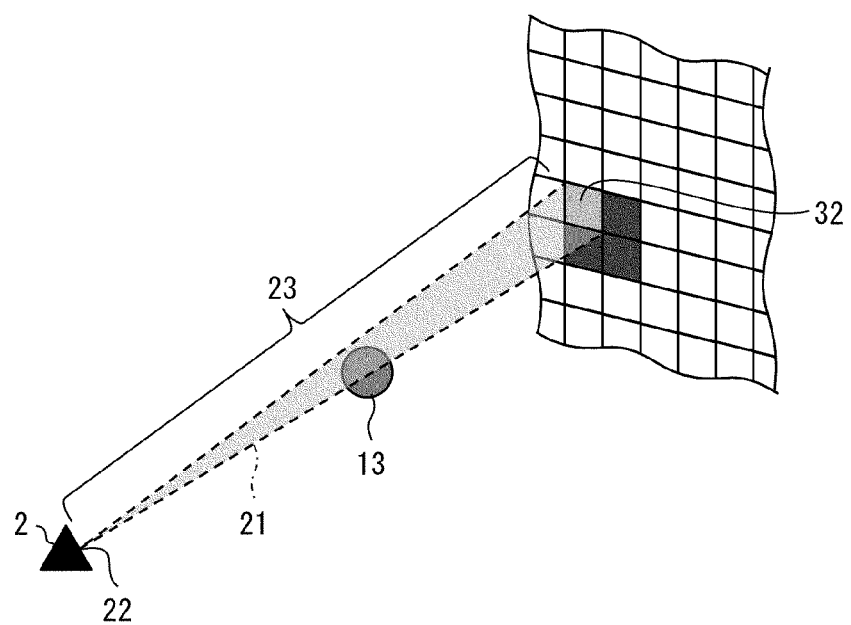
FIG. 8 is a perspective diagram illustrating a quadrangular pyramid formed with (i) the center of that portion of the electromagnetic wave generating source at which an electromagnetic wave is generated and (ii) the four corners of a pixel.

FIG. 8 is a perspective diagram illustrating a quadrangular pyramid 23 formed with (i) the center 22 of that portion of the electromagnetic wave generating source 2 at which an electromagnetic wave 21 is generated and (ii) the four corners of a pixel 32. Mathematical Expression (2) below shows calculation of integration of the blocking rate for a foreign object 13 in the quadrangular pyramid 23. The result of computation based on Mathematical Expression (2) shows the rate at which the intensity of the electromagnetic wave 21 for the pixel 32 is attenuated by the foreign object 13. In Mathematical Expression (2), "x" corresponds to an x direction, and "y" corresponds to a y direction, the x and y directions being both perpendicular to the thickness direction of the foreign object 13 and being perpendicular to each other.

$$\iint (1-e^{-ax})dxdy \quad \text{[Math. 2]}$$

In a case where a foreign object 13 has a minutely small size, that cross section of the quadrangular pyramid 23 which is substantially parallel to the surface of a pixel 32 has a substantially constant area in the vicinity of the foreign object 13. This indicates that the quadrangular pyramid 23 can be approximated to a rectangular parallelepiped in the vicinity of a foreign object 13. In a case where "z" substantially equals 0, Mathematical Expression (3) below holds.

$$(1-e^{-ax}) \approx az \qquad \text{[Math. 3]}$$

These indicate that the rate at which the intensity of an electromagnetic wave 21 is attenuated for a pixel 32 due to a foreign object 13 can be approximated to Mathematical Expression (4) below.

$$a \iint z \, dx \, dy \qquad \text{[Math. 4]}$$

The result of computation based on Mathematical Expression (4) is equivalent to the volume of a portion at which the rectangular parallelepiped and a foreign object 13 coincide with each other. The above description shows that there is a correlation between the amount of attenuation of an X ray as an electromagnetic wave 21 and the volume of a foreign object 13. In other words, the present embodiment allows, for each of a plurality of pixels 32, the volume of a foreign object 13 to be determined on the basis of the relative density described above which foreign object 13 coincides with the rectangular parallelepiped for the pixel 32.

The description below supplementally deals with the mechanism by which the relative densities (namely, B1 and B2 defined above) or its integrated values (C1 to C7 defined above) are converted into the volume of a foreign object 13. Suppose that L represents a first pixel value corresponding to the amount of attenuation of an electromagnetic wave 21 by an inspection target 1 (ideally, L equals the background value). L is multiplied by T of a foreign object 13 to give LT, which indicates the actual first pixel value. L is a value that varies according to the position within the electromagnetic wave 21. In other words, L is a function of x and y (L(x,y)). Since the second pixel value is represented by (LT−L)/L= (T−1), the result of multiplying (T−1) by −1 and integrating (1−T) with respect to x and y, that is, Mathematical Expression (2), approximately equals Mathematical Expression (4). The value given by Mathematical Expression (2) is divided by the factor "a" of proportionality to find the volume of the foreign object 13. In a case where the integrated value of each difference between the first pixel value and the background value is used, (T−1) is replaced with L(T−1). In this case, estimating the volume of a foreign object 13 requires L to be a constant. Stated differently, an inspection target 1 being free from a foreign object 13 can be estimated with use of the integrated value of the differences.

The pixel value integrating section 44 selects each of a plurality of pixels 32 as a target pixel 33, and integrates the respective second pixel values of a group of pixels belonging in a particular continuous region including the target pixel 33.

With the above configuration, setting a continuous region corresponding roughly to the volume of a foreign object 13 which volume is to be set as a detection lower limit value and using, as a threshold value, the integrated value corresponding to the foreign object 13 allows selective detection of a foreign object 13 having a volume with a detection lower limit value or higher.

The pixel value integrating section 44 preferably integrates the respective second pixel values of multiple pixels 32 that (i) each have a second pixel value indicative of an attenuation amount larger than a threshold value and that (ii) form a continuous region. The threshold value preferably clearly indicates, for each of a plurality of pixels 32 and regardless of noise or blur caused to an image based on the electromagnetic wave 21, that an electromagnetic wave 21 has been attenuated by a foreign object 13.

Multiple pixels 32 that each have a second pixel value indicative of an attenuation amount larger than a threshold value and that form a continuous region may be regarded as corresponding to a single individual foreign object 13. The present embodiment is thus capable of estimating the volume of a single individual foreign object 13.

The pixel value integrating section 44 may assign weights to at least two second pixel values as an integration target.

In a case where, for instance, a foreign object 13 is spherical, a portion of the foreign object 13 which portion is farther away from the center toward the surface coincides with an electromagnetic wave 21 by a smaller volume and is thus expected to cause the corresponding portion of the image of the foreign object 13 to be brighter. For the purpose of maximizing a value obtained in correspondence with a foreign object 13, the pixel value integrating section 44 can assign respective weights to the second pixel values for integration so that, for instance, a second pixel value corresponding to a position closer to the surface of the foreign object 13 contributes less to the integrated value.

The pixel value integrating section 44 can assign respective weights to the second pixel values according to the assumed shape (for example, a sphere or a polyhedron) of a foreign object 13 as a detection target as described above and then calculate an integrated value to be capable of more reliably detecting that portion of an image which corresponds to a foreign object 13.

The foreign object inspection device 100 includes an image sensor 3 (X-ray image sensor) and an image processing device 4. The storage section 41 registers, as first pixel values, the pixel values of an image obtained by the X-ray image sensor.

The electromagnetic wave 21 is not limited to an X ray. Examples of the electromagnetic wave 21 other than an X ray include various well-known electromagnetic waves such as visible light and infrared light. The image sensor 3 may accordingly be an image sensor selected as appropriate which image sensor is suited for the kind of electromagnetic wave 21. Specific examples of the image sensor 3 other than an X-ray image sensor include a flat panel detector (FPD).

The second pixel values may, instead of the relative densities described above, each be a difference between the corresponding first pixel value and the corresponding background value. To estimate the volume of a foreign object 13, however, the second pixel values are suitably the relative densities.

The foreign object inspection device 100 is configured such that the image processing device 4 is external to the image sensor 3. The image processing device 4 may, however, alternatively be provided inside the image sensor 3.

Figure 9:
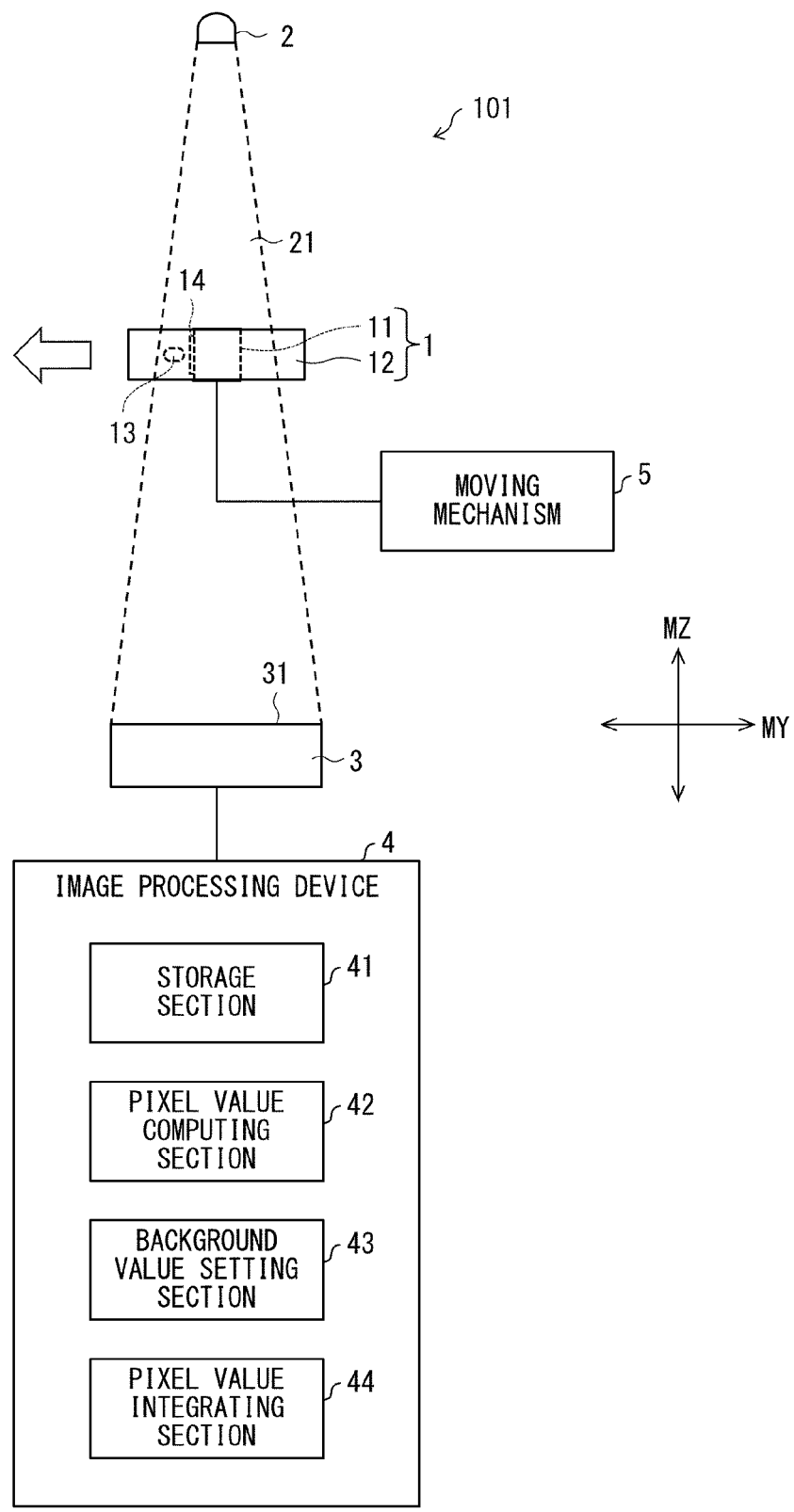
FIG. 9 is a diagram schematically illustrating the configuration of a first variation of the foreign object inspection device illustrated in FIG. 1.

FIG. 9 is a diagram schematically illustrating the configuration of a foreign object inspection device 101 as a first variation of the foreign object inspection device 100 illustrated in FIG. 1. For convenience of explanation, any member below that is identical in function to a member described above is assigned the same reference sign and is not described again. The foreign object inspection device 101 is identical in configuration to the foreign object inspection device 100 except that the foreign object inspection device 101 further includes a moving mechanism 5.

The inspection target 1 can be described as having a thickness between (i) a side surface thereof which side surface corresponds to the side from which an electromagnetic wave 21 enters the inspection target 1 (that is, on the side of the electromagnetic wave generating source 2) and (ii) a side surface thereof which side surface corresponds to the side from which the electromagnetic wave 21 exits the inspection target (that is, on the side of the image sensor 3). The direction of the thickness corresponds to the "MS" direction in FIG. 9. The moving mechanism 5 is configured to translate an inspection target 1 in a direction substantially perpendicular to the MZ direction. Specifically, the moving mechanism 5 is configured to move an inspection target 1 in a direction along a plane substantially perpendicular to the MZ direction in such a manner as to cause the inspection target 1 to cross a space between the electromagnetic wave generating source 2 and the image sensor 3. The direction parallel to the direction in which the moving mechanism 5 moves an inspection target 1 corresponds to the "MY" direction in FIG. 9.

The image sensor 3 is a time delay integration (TDI) sensor. The foreign object inspection device 101, in which the image sensor 3 is a TDI sensor, detects a foreign object 13 attached to the inspection target 1 as described below.

The foreign object inspection device 101 first causes the moving mechanism 5 to translate an inspection target 1 as described above while emitting an electromagnetic wave 21 toward the inspection target 1 being translated by the moving mechanism 5. The electromagnetic wave 21 having propagated through the inspection target 1 is received by a plurality of pixels 32 of the image sensor 3. The plurality of pixels 32 then form an image on the basis of the electromagnetic wave 21. This image is used to detect a foreign object 13. The plurality of pixels 32 form an image on the basis of an electromagnetic wave 21 at each of a plurality of time points. This allows an image of the same portion of the inspection target 1 to be formed by each inspection stage. The inspection stages each include multiple pixels 32 arranged next to one another in the column direction in FIG. 3. The plurality of time points, stated differently, indicate a plurality of states of the inspection target 1 being positioned differently. The foreign object inspection device 101 superimposes images of the same portion of the inspection target 1 (which have been formed by the respective inspection stages) to produce an image in which a foreign object 13 has been made apparent, and thereby detects the foreign object 13.

The foreign object inspection device 101 is capable of, during inspection carried out while an inspection target 1 having a thickness is being moved, (i) carrying out the inspection more efficiently by preventing the inspection capability from decreasing due to an image blur and (ii) reducing the risk of a failure to detect a foreign object.

Figure 10:
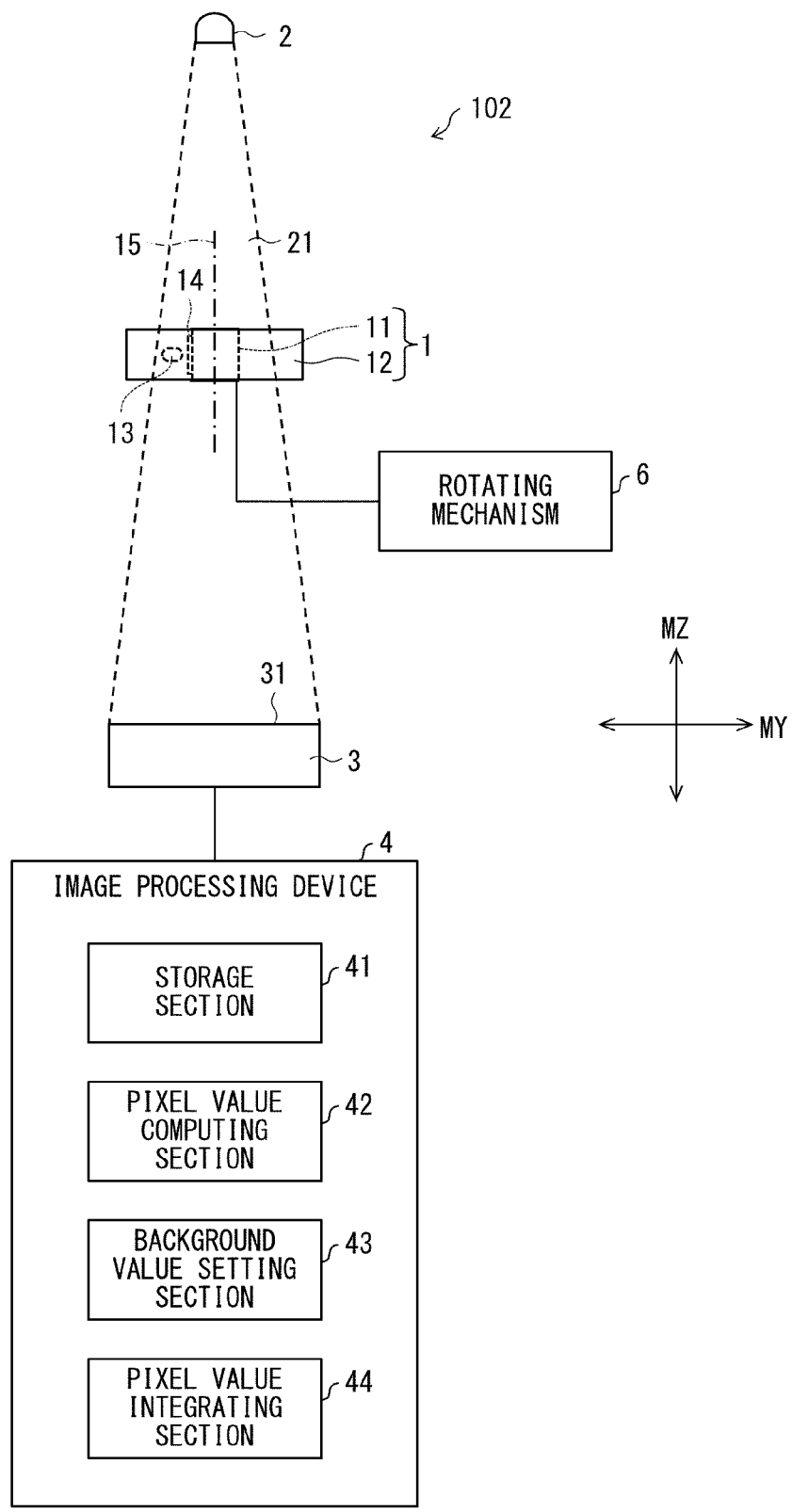
FIG. 10 is a diagram schematically illustrating the configuration of a second variation of the foreign object inspection device illustrated in FIG. 1.
Figure 11:
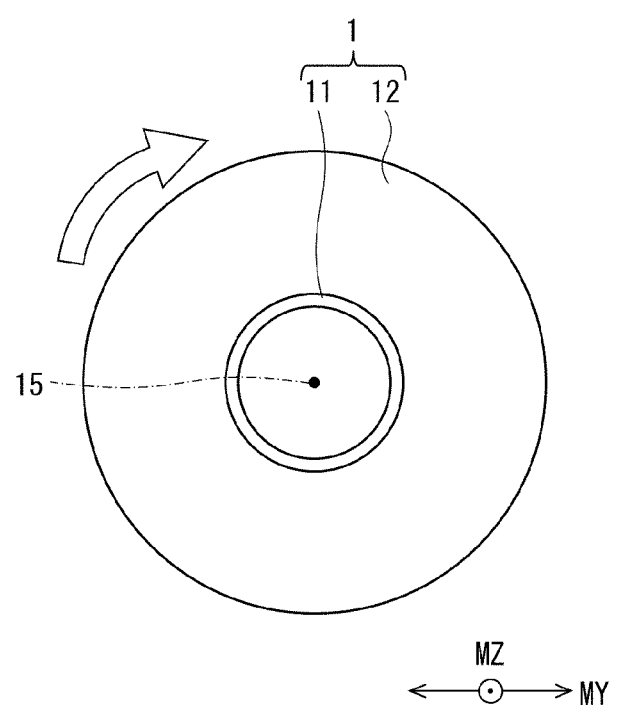
FIG. 11 is a diagram illustrating how a rotating mechanism rotates an inspection target.

FIG. 10 is a diagram schematically illustrating the configuration of a foreign object inspection device 102 as a second variation of the foreign object inspection device 100 illustrated in FIG. 1. FIG. 11 is a diagram illustrating how a rotating mechanism 6 rotates an inspection target 1. The foreign object inspection device 102 is identical in configuration to the foreign object inspection device 100 except that the foreign object inspection device 102 further includes a rotating mechanism 6.

The rotating mechanism 6 is configured to rotate an inspection target 1 about an axis 15 that extends in the MZ direction, that is, from the side from which an electromagnetic wave 21 enters the inspection target 1 to the side from which the electromagnetic wave 21 exits the inspection target 1. As illustrated in FIG. 11, the axis 15 is a central axis for the inspection target 1.

The image sensor 3 is a TDI sensor. The foreign object inspection device 102, in which the image sensor 3 is a TDI sensor, detects a foreign object 13 attached to the inspection target 1 as described below.

The foreign object inspection device 102 first causes the rotating mechanism 6 to rotate an inspection target 1 as described above while emitting an electromagnetic wave 21 toward the inspection target 1 being rotated by the rotating mechanism 6. The electromagnetic wave 21 having propagated through the inspection target 1 is received by a plurality of pixels 32 of the image sensor 3. The foreign object inspection device 102 then performs an operation similar to that performed by the foreign object inspection device 101 to detect a foreign object 13.

Inspecting an inspection target 1 while translating or rotating the inspection target 1 is highly efficient. An inspection carried out while an inspection target 1 having a thickness is being translated or rotated involves an issue of a blur on that portion of an image which corresponds to a foreign object 13. Specifically, in a case where a TDI sensor as the image sensor 3 is used to detect a foreign object 13 on an inspection target 1 through any of the above procedures, an image formed by an inspection stage may show a foreign object 13 that is blurred in the MY direction. This tendency is noticeable particularly in a case where the inspection target 1 has a fairly large thickness.

The foreign object inspection devices 101 and 102, each of which includes the image processing device 4 (in particular, the pixel value integrating section 44), are each capable of, on the basis of a principle similar to that for the foreign object inspection device 100, reducing the risk of a failure to detect a foreign object 13. The foreign object inspection devices 101 and 102 are also each capable of shortening the exposure time period for image capturing as compared to conventional art, similarly to the foreign object inspection device 100.

The description below deals with how the effectiveness of the pixel value integrating section 44 of the foreign object inspection device 100 (which uses an X ray as an electromagnetic wave 21) has been verified. FIG. 12 is a table that shows the results of the verification.

First, an image of an inspection target 1 with a foreign object 13 was captured four times ("FOREIGN-OBJECT IMAGE 1" to "FOREIGN-OBJECT IMAGE 4" in FIG. 12). Further, an image of an inspection target 1 without a foreign object 13 was captured 13 times ("NO-FOREIGN-OBJECT IMAGE 1" to "NO-FOREIGN-OBJECT IMAGE 13" in FIG. 12).

For each of the above images, the density level of a target pixel 33 was determined through each of the approaches 1 to 7 defined below. For the approaches 3 to 7 among the approaches below, the integrated value of the individual second pixel values is used at the stage at which the average of the second pixel values is calculated.

Approach 1: Select, as a density level, the third smallest value among the respective second pixel values of nine pixels 32 arranged in a 3×3 matrix with the target pixel 33 as the center.

Approach 2: Select, as a density level, the average of the smallest value, the second smallest value, and the third smallest value among the respective second pixel values of nine pixels 32 arranged in a 3×3 matrix with the target pixel 33 as the center.

Approach 3: Select, as a density level, the average of the respective second pixel values of nine pixels 32 arranged in a 3×3 matrix with the target pixel 33 as the center.

Approach 4: Select, as a density level, the average of the respective second pixel values of 16 pixels 32 arranged in a 4×4 matrix with the target pixel 33 as the center.

Approach 5: Select, as a density level, the average of the respective second pixel values of 25 pixels 32 arranged in a 5×5 matrix with the target pixel 33 as the center.

Approach 6: Select, as a density level, the average of values obtained by assigning, in accordance with a predetermined normal distribution, respective weights to the respective second pixel values of 25 pixels 32 arranged in a 5×5 matrix with the target pixel 33 as the center.

Approach 7: Select, as a density level, the average of values obtained by assigning, in accordance with a normal distribution different from that for the approach (specifically, with a different Gaussian-weight variance for use in assigning weights), respective weights to the respective second pixel values of 25 pixels 32 arranged in a 5×5 matrix with the target pixel 33 as the center.

For each of the approaches 1 to 7, a worst S, a worst N, and a worst S/worst N ratio defined below were determined.

Worst S: That one of the respective density levels of "FOREIGN-OBJECT IMAGE 1" to "FOREIGN-OBJECT IMAGE 4" which is the closest to 0%

Worst N: That one of the respective density levels of "NO-FOREIGN-OBJECT IMAGE 1" to "NO-FOREIGN-OBJECT IMAGE 13" which is the farthest from 0%

Worst S/worst N ratio: The ratio of the worst S to the worst N

A worst S/worst N ratio of greater than 1 indicates that the "FOREIGN-OBJECT IMAGE 1" to "FOREIGN-OBJECT IMAGE 4" and "NO-FOREIGN-OBJECT IMAGE 1" to "NO-FOREIGN-OBJECT IMAGE 13" are discriminated from one another appropriately, and thus shows a sufficient prevention of a failure to detect a foreign object 13 in a state where there is no false detection (that is, an event of, even in a case where there is no foreign object 13, determining that a foreign object 13 has been detected). Further, a larger number of pixels 32 of which the respective second pixel values are integrated indicates that the above discrimination is clearer, and can thus be regarded as showing a larger effect of preventing a failure to detect a foreign object 13 in a state where there is no false detection.

FIG. 12 shows that the approaches 3 to 7 each have a worst S/worst N ratio of greater than 1, indicating a sufficient prevention of a failure to detect a foreign object 13 in a state where there is no false detection. FIG. 12 shows that the approaches 1 and 2 each have a worst S/worst N ratio of smaller than 1, indicating an insufficient prevention of a failure to detect a foreign object 13 in a state where there is no false detection. The worst S/worst N ratio is larger for the approach 4 than for the approach 3, and is larger for the approach 5 than for the approach 4. Stated differently, the worst S/worst N ratio is larger as a larger number of pixels 32 are used to integrate second pixel values. This indicates that a larger worst S/worst N ratio means a larger effect of preventing a failure to detect a foreign object 13 in a state where there is no false detection.

The above results prove that integrating the respective second pixel values of a group of pixels belonging in a continuous region including a target pixel 33 increases the effect of preventing a failure to detect a foreign object 13 in a state where there is no false detection. The above results thereby verify the effectiveness of the pixel value integrating section 44 of the foreign object inspection device 100.

[Recap]

An image processing device in accordance with an embodiment of the present invention is an image processing device for processing an image based on an X ray having been emitted radially by an X-ray source and having propagated through an inspection target having a foreign object, the image processing device including: a storage section configured to store respective first pixel values of a plurality of pixels that form the image; a pixel value computing section configured to calculate respective second pixel values of the plurality of pixels on a basis of the first pixel values; and a pixel value integrating section configured to integrate respective second pixel values of a group of pixels belonging in a continuous region.

With the above configuration, the pixel value integrating section integrates the respective second pixel values of pixels in a group belonging in a particular continuous region. Setting the size of the continuous region to a size larger than the size of a foreign object as a detection target makes it possible to obtain an image having contrast between a foreign object and an inspection target having the foreign object. This allows that portion of an image which corresponds to a foreign object to be detected, thereby reducing the risk of a failure to detect a foreign object.

An image processing device in accordance with an embodiment of the present invention may be configured such that the foreign object includes a substance that attenuates a propagating X ray more than the inspection target. This configuration allows the pixel value integrating section to calculate the sum total of the amount of X-ray attenuation caused by a foreign object that an inspection target has.

An image processing device in accordance with an embodiment of the present invention may be configured such that the pixel value integrating section selects each of the plurality of pixels as a target pixel, integrates respective second pixel values of a group of pixels belonging in a continuous region including the target pixel, and thereby obtains an integrated value of the target pixel.

With the above configuration, setting a continuous region corresponding roughly to the volume of a foreign object which volume is to be set as a detection lower limit value allows detection of a foreign object having a volume with a detection lower limit value or higher.

An image processing device in accordance with an embodiment of the present invention may be configured such that the continuous region is larger than a region including all pixels corresponding to a blur in a portion of the image which portion corresponds to the foreign object. This configuration more reliably allows that portion of an image which corresponds to a foreign object to be detected.

An image processing device in accordance with an embodiment of the present invention may be configured such that the pixel value integrating section obtains the integrated value after assigning respective weights to the second pixel values in accordance with an assumed shape of the foreign object as a detection target. This configuration reduces the risk of a failure to detect that portion of an image which corresponds to a foreign object.

An image processing device in accordance with an embodiment of the present invention includes an X-ray image sensor; and any of the above image processing devices the first pixel values being pixel values of an image obtained by the X-ray image sensor.

An image processing method in accordance with an embodiment of the present invention is an image processing method for processing an image based on an X ray having been emitted radially by an X-ray source and having propagated through an inspection target including a foreign object, the image processing method including: a storage step of storing respective first pixel values of a plurality of pixels that form the image; a pixel value computing step of calculating respective second pixel values of the plurality of pixels on a basis of the first pixel values; and a pixel value integrating step of integrating respective second pixel values of a group of pixels belonging in a continuous region. This reduces the risk of a failure to detect a foreign object.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1 Inspection target
11 Core
12 Nonaqueous electrolyte secondary battery separator
13 Foreign object
14 Tape or label
15 Axis
2 Electromagnetic wave generating source
21 Electromagnetic wave
22 Center of a portion at which an electromagnetic wave is generated
23 Quadrangular pyramid
3 Image sensor
31 Principal surface
32 Pixel
33 Target pixel
34 Reference pixel
35 Unsuitable pixel
36 to 38 Pixel group
4 Image processing device
41 Storage section
42 Pixel value computing section
43 Background value setting section
44 Pixel value integrating section
5 Moving mechanism
6 Rotating mechanism
100, 101, 102 Foreign object inspection device

The invention claimed is:

1. An image processing method for processing an image based on an X ray having been emitted radially by an X-ray source and having propagated through an inspection target including a foreign object, the image processing method comprising:
a storage step of storing respective first pixel values of a plurality of pixels that form the image;
a pixel value computing step of calculating respective second pixel values of the plurality of pixels on a basis of the first pixel values; and
a pixel value integrating step of integrating respective second pixel values of a group of pixels belonging in a continuous region,
wherein in the pixel value integrating step, each of the plurality of pixels is selected as a target pixel, and respective second pixel values of a group of pixels belonging in a continuous region including the target pixel are integrated, and thereby an integrated value of the target pixel is obtained.

2. The image processing method according to claim 1, wherein the foreign object includes a substance that attenuates a propagating X ray more than the inspection target.

3. A foreign object inspecting method for inspecting a foreign object, the foreign object inspecting method comprising:
an image obtaining step of obtaining, with use of an X-ray image sensor, an image based on an X ray having been emitted radially by an X-ray source and having propagated through an inspection target including the foreign object; and
an image processing step of processing the image by the image processing method according to claim 1.

4. An image processing method for processing an image based on an X ray having been emitted radially by an X-ray source and having propagated through an inspection target including a foreign object, the image processing method comprising:
a storage step of storing respective first pixel values of a plurality of pixels that form the image;
a pixel value computing step of calculating respective second pixel values of the plurality of pixels on a basis of the first pixel values; and
a pixel value integrating step of integrating respective second pixel values of a group of pixels belonging in a continuous region,
wherein the continuous region is larger than a region including all pixels corresponding to a blur in a portion of the image which portion corresponds to the foreign object.

5. The image processing method according to claim 4, wherein the foreign object includes a substance that attenuates a propagating X ray more than the inspection target.

6. A foreign object inspecting method for inspecting a foreign object, the foreign object inspecting method comprising:
an image obtaining step of obtaining, with use of an X-ray image sensor, an image based on an X ray having been emitted radially by an X-ray source and having propagated through an inspection target including the foreign object; and
an image processing step of processing the image by the image processing method according to claim 4.

7. An image processing method for processing an image based on an X ray having been emitted radially by an X-ray source and having propagated through an inspection target including a foreign object, the image processing method comprising:
a storage step of storing respective first pixel values of a plurality of pixels that form the image;
a pixel value computing step of calculating respective second pixel values of the plurality of pixels on a basis of the first pixel values; and
a pixel value integrating step of integrating respective second pixel values of a group of pixels belonging in a continuous region,
wherein in the pixel value integrating step, an integrated value is obtained after respective weights are assigned to the second pixel values in accordance with an assumed shape of the foreign object as a detection target.

8. The image processing method according to claim 7, wherein the foreign object includes a substance that attenuates a propagating X ray more than the inspection target.

9. A foreign object inspecting method for inspecting a foreign object, the foreign object inspecting method comprising:
an image obtaining step of obtaining, with use of an X-ray image sensor, an image based on an X ray having been emitted radially by an X-ray source and having propagated through an inspection target including the foreign object; and an image processing step of processing the image by the image processing method according to claim 7.

\* \* \* \* \*